United States Patent [19]

Fujii et al.

[11] Patent Number: 4,482,579

[45] Date of Patent: Nov. 13, 1984

[54] APPARATUS FOR SUPPLYING VISCOUS MATERIAL

[75] Inventors: Makoto Fujii; Akira Ikuzawa, both of Escondido; Edward C. Sullivan, San Diego, all of Calif.

[73] Assignee: Sony Corporation, Tokyo, Japan

[21] Appl. No.: 458,637

[22] Filed: Jan. 17, 1983

[51] Int. Cl.³ .............................................. C03C 17/04
[52] U.S. Cl. .......................................... 427/64; 65/43; 118/315; 118/323; 427/421; 445/45
[58] Field of Search .................. 118/315, 323; 427/64, 427/421; 445/45; 65/43

[56] References Cited

U.S. PATENT DOCUMENTS

| | | | |
|---|---|---|---|
| 3,492,146 | 1/1970 | Kornaker | 65/43 |
| 4,137,341 | 1/1979 | Adachi | 65/43 |
| 4,262,036 | 4/1981 | Mineyama et al. | 118/315 X |
| 4,328,022 | 5/1982 | Bonk et al. | 65/43 |

Primary Examiner—John H. Newsome
Attorney, Agent, or Firm—Lewis H. Eslinger; Alvin Sinderbrand

[57] ABSTRACT

For supplying frit slurry to the sealing surface of a funnel portion of a cathode ray tube, air under pressure, preferably saturated with a solvent for the frit slurry, is supplied to a vessel containing the frit slurry, and the latter is transported by the air under pressure out of an outlet of the vessel and through a hose or hoses for deposit on the sealing surface. The flow of frit slurry is regulated by a valve between the vessel outlet and the hoses. The frit slurry contained in the vessel is stirred continuously to maintain a substantially constant slurry viscosity as the slurry leaves the vessel outlet.

15 Claims, 2 Drawing Figures

APPARATUS FOR SUPPLYING VISCOUS MATERIAL

BACKGROUND OF THE INVENTION

1. Field of the Invention

The present invention relates to the application of a viscous material on a sealing surface, and more particularly is directed to improvements in the application of frit slurry to a sealing surface of a funnel-shaped member of a cathode ray tube.

2. Description of the Prior Art

In assembling various types of glass display tubes such as, for example, in securing a glass face plate member of a cathode ray tube to a glass funnel-shaped rear member thereof, a stripe of frit slurry is applied, for example, to an edge or sealing surface of the funnel-shaped rear member, and the face plate member is thereafter placed against the coated sealing surface of the funnel-shaped rear member. The two members are then heated to a temperature which causes the frit slurry to fuse and thereby unite the members.

According to the prior art, an apparatus used for supplying frit slurry during assembly of the cathode ray tube includes a pump through which the slurry travels and which provides the necessary driving force required to transport the frit slurry from a holding tank to the sealing surface to be coated. However, if the viscosity of the slurry is increased, which may be desirable for various reasons, the pump becomes clogged with dried slurry, and this is especially the case with viscosities of approximately 75,000 centipoises or more. More specifically, as slurry travels through the pump, the slurry hardens due to exposure to air and accumulates inside a cylinder of the pump which thereby prevents proper piston motion in the cylinder and results in malfunctioning of the pump. Depending on the level of viscosity, the pump may need to be cleaned every one to two hours resulting in an inefficient, time consuming and undesirably costly assembly operation.

OBJECTS AND SUMMARY OF THE INVENTION

Accordingly, it is an object of the present invention to provide a method and apparatus for supplying viscous material and which avoids the foregoing disadvantages of the prior art.

More specifically, it is an object of the present invention to provide a new and improved method and apparatus for supplying a viscous material to the surface of an article without the need to pass the viscous material through a pump or other device likely to be clogged thereby.

It is another object of the present invention to provide a method and apparatus for supplying frit slurry to the sealing surface of a member of a cathode ray tube wherein the frit slurry has a viscosity of approximately 75,000 centipoises.

In accordance with an aspect of this invention an apparatus for supplying a viscous material to a surface of an article comprises supply means for providing a gas under pressure, saturating means for saturating the gas with a vaporized solvent for the viscous material to deter drying of the latter when exposed to the saturated gas under pressure, and a vessel or containment means for containing the viscous material and to which the saturated gas under pressure is supplied so that the viscous material is forced by the saturated gas under pressure through an outlet of the containment means.

The above, and other objects, features and advantages of the invention, will be apparent from the following detailed description which is to be read in conjunction with the accompanying drawings.

DETAILED DESCRIPTION OF A PREFERRED EMBODIMENT

Figure 1:
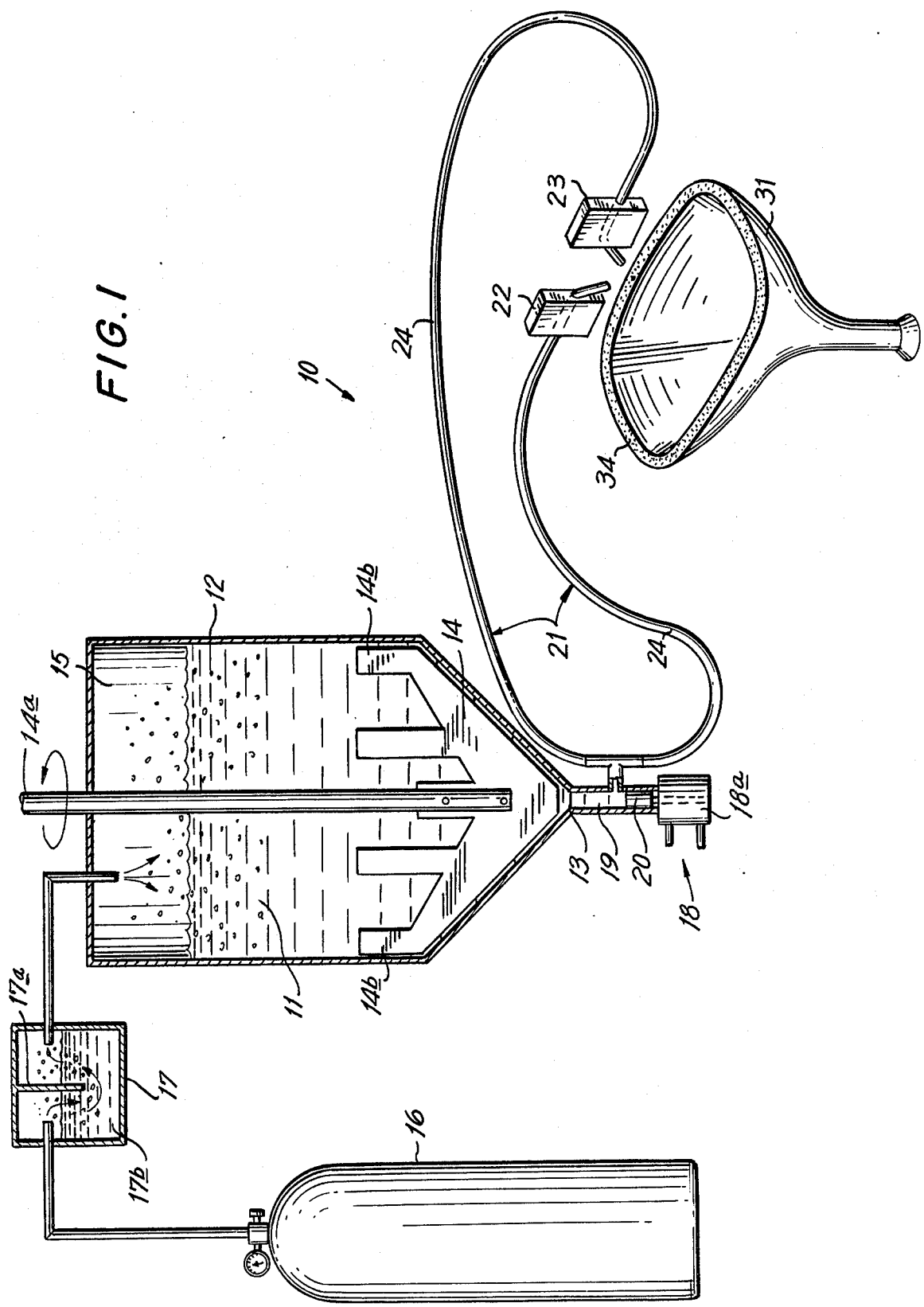
FIG. 1 is a schematic diagram of an apparatus for supplying a viscous material in accordance with an embodiment of the present invention.

Referring to FIG. 1 in detail, it will be seen that an apparatus 10 according to an embodiment of this invention contains a supply 11 of viscous material, such as frit slurry, in a vessel 12 which has an outlet 13 at its lower end and is provided with a stirrer 14.

Typically, the frit slurry 11 in vessel 12 is comprised of 80 kilograms of frit (Owens Illinois CV-808HD—Tradename—manufactured by Owens Illinois Glass Co.) which consists of 70%, by weight, PbO, 13%, by weight, ZnO and the remainder $SiO_2$ and $B_2O_3$, and for each 10 kilograms of the frit powder, 900 to 1000 cc of a carrier therefor consisting of isoamyl acetate solvent and between 1.1 and 1.3% by weight, based on the weight of the carrier, of nitrocellulose wetted with isopropyl alcohol as a binder.

In accordance with this invention, frit slurry 11 is forced through outlet 13 by a gas under pressure supplied to the space 15 in vessel 12 above frit slurry 11, and preferably being saturated with a vaporized solvent for the frit slurry. Typically, the gas is air, but is not limited thereto, which for purposes of example, is pressurized to 25 to 30 pounds per square inch. The air is supplied under pressure from any suitable source such as, for example, a pressurized air tank 16. The air is fed from tank 16 through an enclosed container 17 containing a fluid supply 17b which saturates the air, whereupon the latter is supplied, as saturated air under pressure, to space 15 in vessel 12. Normally, frit slurry 12 is dried by exposure to air. Therefore, the fluid used to saturate the air is effective to deter drying of the frit slurry. A suitable fluid is the solvent for the frit slurry, that is, isoamyl acetate in the previously described example.

Container 17 can employ various methods, as are well known in the art, in saturating the pressurized air with isoamyl acetate. For example, as shown in FIG. 1, container 17 includes a barrier 17a which is impervious to air and which extends from the inner top surface of container 17 to beneath the surface of fluid supply 17b. As pressurized air enters container 17, the pressurized air is forced to travel under barrier 17a and through fluid supply 17b in the form of air bubbles. The air bubbles emerge from the fluid on the other side of barrier 17a as pressurized air saturated with isoamyl acetate. In another illustrative embodiment, container 17 may have a tube (not shown) extending therein and through which the pressurized air from tank 16 is received, with such tube having an open end in container 17 below the surface of fluid supply 17b. In this case also, the pressurized air supplied to container 17 can exit from the latter only after intimate contact with the isoamyl acetate so as to be saturated with the latter.

Frit slurry, in general, has a tendency to decrease in viscosity when stirred for prolonged periods of time. Thus, in order to ensure that the slurry leaving vessel 12 through outlet 13 will have a particularly high viscosity, for example, of 75,000 centipoises, it is desirable to stir the slurry only before it leaves vessel 12. In other words, only that portion of the supply 11 of frit slurry contained in vessel 12 which is closest to outlet 13 should be stirred by stirrer 14 which includes a shaft 14a with blades 14b thereon. Blades 14b are submerged beneath the surface of slurry supply 11 to stir only that portion of slurry supply 11 occupying the bottom portion of vessel 12. More particularly, blades 14b should not extend above or near the slurry surface. Otherwise, as stirrer 14 rotates, all of the slurry supply 11 would be stirred continuously for a prolonged period resulting in eventual breakdown of the slurry into the frit and the carrier therefor, and also in the entrapment of air bubbles in the frit slurry by which the viscosity of the latter is rendered uneven. Thus, by submerging blades 14b beneath the surface of slurry supply 11, and by substantially continuously stirring only that portion of slurry supply 11 which occupies the bottom portion of vessel 12, the frit slurry forced through outlet 13 by the pressurized, saturated air admitted to space 15 is substantially maintained at a predetermined high viscosity, such as, 75,000 centipoises. A typical height for blades 14b is approximately one-third the height of vessel 12 but is not limited thereto. Furthermore, inasmuch as the slurry has its viscosity reduced by the stirring thereof, the slurry initially poured into vessel 12 desirably has a viscosity higher than the viscosity which the slurry is to have when forced through outlet 13. For example, assuming that the viscosity of the slurry forced through outlet 13 is 75,000 centipoises, the slurry initially poured into vessel 12 could have a viscosity of 100,000 centipoises.

Communicating with outlet 13 is a valve 18 which, for example, is operated by a pressurized air or pneumatic control cylinder 18a. Valve 18 regulates the flow of frit slurry 11 through outlet 13 by, for example, blocking or clearing a valve passageway 19 by means of a piston-like valve element 20. When valve 18 is open, as shown on FIG. 1, frit slurry travels from outlet 13 through passageway 19 and one or more duct-like elements, such as, hoses 21, which communicate with the passageway in valve 18. Hoses 21 and outlet 13 communicate with the passageway 19 in valve 18 to form an airtight seal therewith so that the frit slurry is not exposed to or dried by any air while traveling through valve 18. Finally, the frit slurry is discharged through nozzles 22 and 23 located at the distal ends of hoses 21.

In operation of apparatus 10, frit slurry is discharged through nozzles 22 and 23 by moving piston-like valve element 20 downwardly out of passageway 19 in valve 18 which allows frit slurry to flow therethrough from outlet 13 and through hoses 21 due to the pressurized, saturated air in space 15 forcing frit slurry from the supply 11 in vessel 12 through outlet 13. The discharge of frit slurry through nozzles 22 and 23 onto, for example, an upwardly facing sealing surface 34 of a funnel-shaped rear member 31 of a cathode ray tube is discontinued by closing valve 18, for example, by moving piston-like valve element 20 upwardly to block passageway 19. After blockage of passageway 19 by valve element 20, frit slurry continues to flow from nozzles 22 and 23 for a predetermined duration due to residual pressure in the hoses 21. Such pressure remaining in the hoses for a predetermined duration results from the high viscosity of the frit slurry which delays the release of the pressure to the atmosphere through the nozzles. Walls 24 of hoses 21 may be typically made of nylon or other suitable materials. Additionally, in order to equalize the terminal expulsion or discharge of slurry through nozzles 22 and 23, it is desirable that both hoses 21 have substantially equal dimensions. It will be appreciated that of equal dimensions of hoses 21 ensure that the discharge of frit slurry through nozzles 22 and 23 begins and terminates at substantially the same time.

Figure 2:
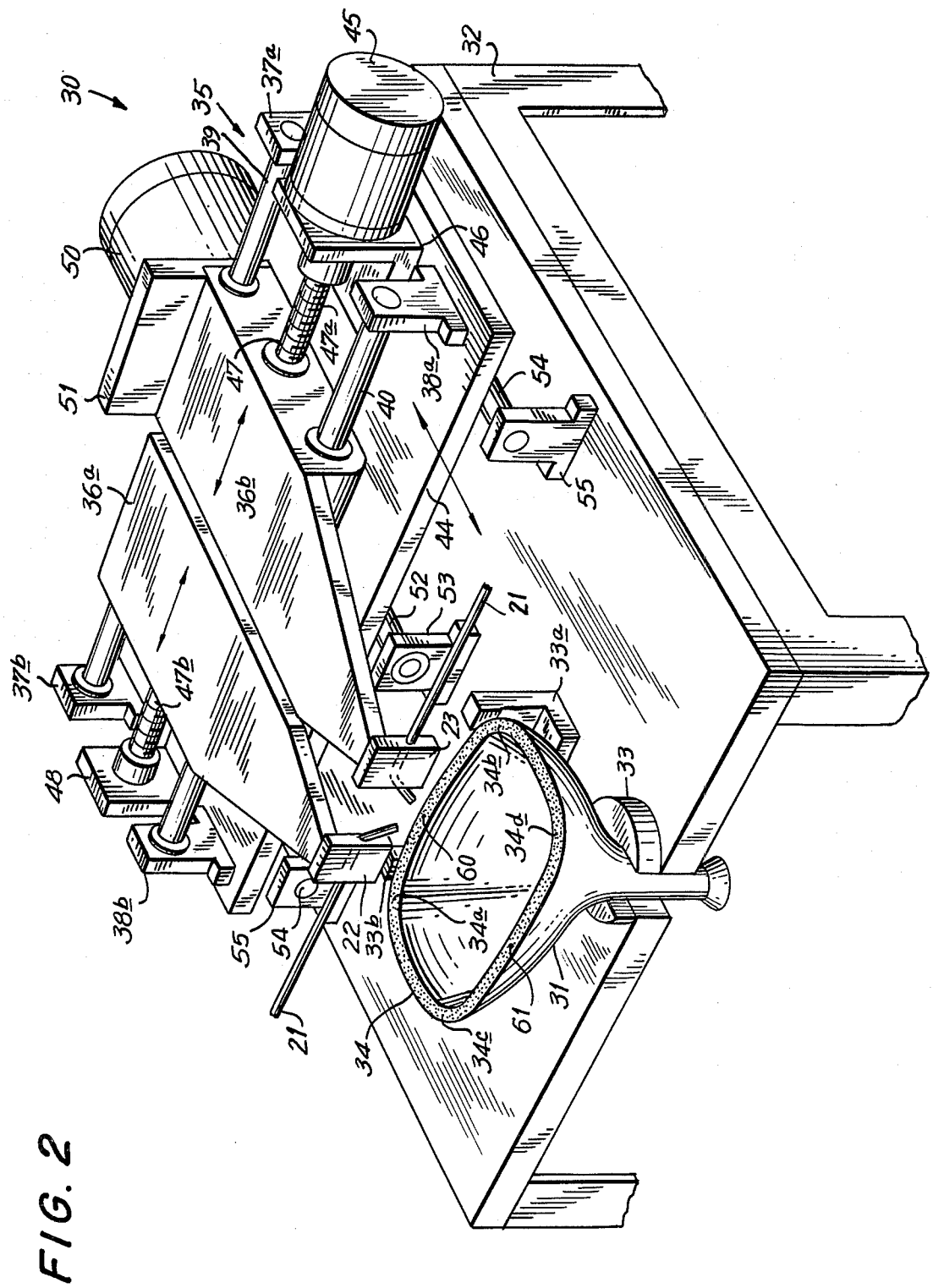
FIG. 2 is a perspective view of a coating apparatus for coating the funnel-shaped rear member of a cathode ray tube with frit slurry, and in which the apparatus of FIG. 1 can be desirably employed for supplying the frit slurry.

Referring now to FIG. 2, it will be seen that a coating apparatus 30 in which the frit slurry supplying apparatus 10 according to the present invention can be employed for supplying frit slurry to a sealing surface of funnel-shaped rear member 31 of a cathode ray tube may be similar to the apparatus disclosed in U.S. Pat. No. 4,137,341 issued on Jan. 30, 1979, and having an assignee in common herewith.

Apparatus 30 is shown mounted on a bench 32 which carries a supporter 33 for the funnel-shaped rear member 31. The supported member 31 is held in its upright position by a pair of holding members 33a and 33b which are generally L-shaped and fixed on bench 32, so that sealing surface 34 of funnel 31 faces upwardly and is disposed in a horizontal plane.

A drive mechanism 35 is mounted on bench 32 behind the supported funnel 31. Nozzles 22 and 23 are attached to a pair of transport plates 36a and 36b which are slidably supported by a pair of rods 39 and 40, respectively. Rods 39 and 40 are connected, at their ends, to supporting brackets 37a and 37b, and 38a and 38b, respectively. Supporting brackets 37a, 37b, 38a and 38b are fixedly connected to a movable transport table 44. A numerical control (NC) motor 45 for laterally transporting nozzles 22 and 23 is mounted on a supporting member 46 on transport table 44. A shaft 47 of NC motor 45 is rotatably supported at one end by a support member 48 and extends through transport plates 36a and 36b. Shaft 47 includes shaft portions 47a and 47b are oppositely threaded and are threadably engaged in tapped holes in transport plates 36a and 36b.

Another NC motor 50 for longitudinally transporting nozzles 22 and 23 is mounted on supporting member 51 on bench 32. A threaded shaft 52 of NC motor 50 extends rotatably from the motor and is rotatably supported at its remote end by a support member 53 on bench 32. Shaft 52 is inserted through a threaded holes of a block (not shown) fixed to the lower surface of transport table 44. Transport table 44 is slidably supported by a pair of rods 54 fixedly connected to supporting brackets 55, two of which are not shown. An NC control apparatus (not shown) is operably connected to NC motors 45 and 50.

Operation of the above-described apparatus 30 is as follows: Drive mechanism 35 and nozzles 22 and 23 are initially positioned as shown in FIG. 2 to dispose nozzles 22 and 23 adjacent to each other above sealing surface 34 at an initial point 60, which is substantially at the center of one longer side of sealing surface 34. Piston-like valve element 20, which was initially positioned to block passageway 19, is now repositioned so that substantially no portion of piston-like valve element 20 blocks passageway 19 (not shown). Thus, frit slurry can flow through valve 18 and hoses 21 and is discharged through nozzles 22 and 23 under the pressure of the saturated air in space 15. Coincident in time with the discharge of frit slurry through nozzles 22 and 23, NC motor 45 is driven in the normal direction by the NC control apparatus to rotate shaft 47 at a first predetermined speed. With the rotation of shaft 47, transport plates 36a and 36b are moved in opposite directions by the oppositely threaded portions 47a and 47b of shaft 47 engaged with threaded bores in transport plates 36a and 36b, respectively. Accordingly, nozzles 22 and 23, carried by transport plates 36a and 36b, are transported in opposite directions at the first predetermined speed along one longer side of sealing surface 34 of funnel 31 while discharging frit slurry onto sealing surface 34. When nozzles 22 and 23 approach corners 34a and 34b, respectively, of sealing surface 34, NC motor 50 is driven in the normal direction by the NC control apparatus and rotates threaded shaft 52 at a second predetermined speed. With the rotation of shaft 52, transport table 44 engaged with shaft 52 is moved toward supported funnel 31. By reason of the composite movements of transport plates 36a and 36b and transport table 44, nozzles 22 and 23 turn corners 34a and 34b, respectively, of sealing surface 34 while discharging frit slurry onto sealing surface 34. When nozzles 22 and 23 have finished turning corners 34a and 34b, NC motor 45 is stopped under the control of the NC control apparatus and motor 50 continues to operate so that nozzles 22 and 23 are then transported, respectively, along the shorter sides of sealing surface 34 at the second predetermined speed while continuing to discharge frit slurry onto sealing surface 34. When nozzles 22 and 23 approach corners 34c and 34d, respectively, of sealing surface 34, NC motor 45 is again started by the NC control apparatus and rotates shaft 47 in the reverse direction at the first predetermined speed. With such rotation of shaft 47, transport plates 36a and 36 are moved toward each other. As a result of the composite movements of transport plates 36a and 36b and transport table 44, nozzles 22 and 23 turn corners 34c and 34d of sealing surface 34 while continuing to discharge frit slurry onto sealing surface 34. When nozzles 22 and 23 have finished turning corners 34c and 34d, the NC control apparatus stops NC motor 50 and motor 45 continues to operate in the reverse direction so that nozzles 22 and 23 are transported toward each other along the other long side of sealing surface 34 for discharging frit slurry thereon. As nozzles 22 and 23 approach terminal point 61, piston-like valve element 20 of valve 18 moves to block passageway 19 (FIG. 1) and thereby halts the flow of frit slurry 11 through outlet 13. Typically, valve 18 is closed approximately two seconds before nozzles 22 and 23 reach terminal point 61. That is, based on the first predetermined speed of movement of nozzles 22 and 23 by motor 45, valve 18 is closed a predetermined time before nozzles 22 and 23 reach terminal point 61. However, portion of the frit slurry contained within hoses 21 at the time when valve 18 is closed is forced from hoses 21 to continue the discharge of slurry through nozzles 22 and 23 onto sealing surface 34 until the nozzles actually arrive at terminal point 61. Such continued discharge is due to the residual pressure left in the hoses as earlier noted. As nozzles 22 and 23 reach terminal point 61, positioned substantially at the center of the other relatively long side of sealing surface 34, both the discharge of frit slurry from nozzles 22 and 23 and the operation of NC motor 45 are stopped. The frit slurry coating operation is at this point completed and a uniform continuous layer of frit slurry is formed on sealing surface 34.

It should be noted that the present invention can be used in supplying frit slurry to surfaces other than a sealing surface of a cathode ray tube. Additionally, the present invention is not limited in its application to frit slurry but rather can be used for supplying other materials to surfaces of articles. However, the invention is particularly advantageous for a viscous material of high viscosity, for example, 75,000 centipoises, inasmuch as the viscous material does not travel through a pump which can become clogged with hardened viscous material. Furthermore, in accordance with the present invention, air need not be pressurized before saturation with isoamyl acetate but rather can be saturated with such solvent prior to pressurization thereof.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for applying viscous material to a surface of an article comprising:
   supply means for providing a gas under pressure;
   saturating means for saturating said gas with a vaporized solvent for said viscous material to deter drying of the latter when exposed to the saturated gas under pressure; and
   containment means for containing said viscous material and to which said saturated gas under pressure is supplied, said containment means having an outlet through which said viscous material is forced by said saturated gas under pressure for application to said surface.

2. An apparatus as in claim 1; wherein said containment means includes stirring means which substantially, continuously stir said viscous material to maintain a substantially constant viscosity of said viscous material forced through said outlet.

3. An apparatus as in claim 2; wherein said stirring means includes blades which are fully submerged in said viscous material.

4. An apparatus as in claim 3; further comprising duct means for supplying said viscous material therethrough to said surface of said article and which communicate at one end with said outlet of said containment means.

5. An apparatus as in claim 4; wherein said duct means have nozzle means at the other end thereof.

6. An apparatus as in claim 5; wherein said duct means includes a pair of hoses of substantially equal dimensions.

7. An apparatus as in claim 5; further comprising valve means actuable for halting the flow of said viscous material from said containment means outlet to said one end of said duct means.

8. A method of applying a viscous material to a surface of an article which comprises the steps of:
   pressurizing a gas;
   saturating said gas with a solvent for said viscous material; and
   applying said saturated gas under pressure to a vessel containing said viscous material and having an outlet through which said viscous material is forced by said saturated gas under pressure for application to said sealing surface.

9. A method as in claim 8; wherein said gas is air.

10. A method as in claim 9; wherein said solvent is isoamyl acetate and said viscous material is frit slurry.

11. A method as in claim 10; wherein said air is pressurized at approximately 25 to 30 pounds per square inch.

12. A method as in claim 11; wherein said frit slurry forced through said outlet has a viscosity of approximately 75,000 centipoises.

13. A method as in claim 10; further comprising substantially continuously stirring said frit slurry in said vessel adjacent said outlet to maintain a substantially constant viscosity of said frit slurry as forced through said outlet.

14. A method as in claim 13; wherein the frit slurry is applied in an atmosphere having a pressure less than the pressure of said pressurized air and to said sealing surface of the article through at least one duct which communicates, at one end, with said outlet and has a nozzle at its other end; and further comprising moving said nozzle in a predetermined path along said sealing surface between initial and terminal points, allowing the flow of said frit slurry through said outlet into said duct as said nozzle moves so that the frit slurry is discharged from said nozzle in said path from said initial point, and halting said flow of the frit slurry through said outlet into said duct prior to the arrival of said nozzle at said terminal point so that discharge of the frit slurry from said nozzle during the final incremental movement of the latter to said terminal point is effected by a gradual release of pressure within said at least one duct to said atmosphere through said nozzle.

15. A method as in claim 8; wherein said article is a funnel portion of a cathode ray tube having a sealing surface, and said viscous material is frit slurry applied to the sealing surface of the funnel portion.

* * * * *